Patented Oct. 8, 1946

2,409,085

UNITED STATES PATENT OFFICE 2,409,085

STARCH SOLUBILIZATION

George P. Vincent, Briarcliff Manor, N. Y., assignor to The Mathieson Alkali Works, Inc., New York, N. Y., a corporation of Virginia No Drawing. Application January 25, 1944, Serial No. 519,660

4 Claims. (Cl. 127—33)

This invention relates to the treatment of starchy substances and starches such as, for example, corn, "tapioca," "sago" and "arrowroot" starch and more particularly to an improved process whereby starch may be oxidized or solubilized.

One of the more important industrial uses for starch is in the field of adhesives. In addition to its use in various adhesive preparations, starch is widely used in the preparation of size and coatings in the paper industry and the textile industry. For such purposes an oxidized or solubilized starch is necessary.

To accomplish the necessary conversion it has previously been proposed to oxidize and perhaps chlorinate the starch by treatment with a hypochlorite. Such an operation is of necessity a long and carefully controlled one, at relatively low temperatures, but which must also employ low concentrations in order that the starch may not be excessively attacked, all of which add materially to the cost of the product.

Another common method of converting starch is to employ an enzyme, diastase, for example, or the same result may be accomplished by the use of a peroxide which does not introduce excessive alkalinity, for example, barium peroxide. In such methods, however, the reaction must frequently be heated to a point above the gelatinizing temperature of the starch. This, generally is a decided disadvantage, as a gelatinized product must be used shortly after its preparation and cannot readily be marketed.

I have found that by treating starch with a chlorite in the presence of an agent having the property of activating the chlorite, such as subsequently described herein, the starch may be oxidized or solubilized without objectionable gelatinization.

In my co-pending application, Serial No. 351,207, as originally filed August 3, 1940, of which the present application is in part a continuation, I have described generally the treatment of starch with activated chlorite for bleaching, sterilizing, and rendering thermophile-free or oxidizing and solubilizing the starch. The present invention relates particularly to the oxidizing and solubilizing of starch, as distinguished from sterilizing and bleaching, though substantial bleaching and sterilizing may also be accomplished by my solubilizing treatment.

In accordance with my present invention, the oxidizing and solubilizing of the starch is accomplished by treating the starch in an aqueous medium with a minor proportion of a soluble inorganic chlorite, sodium chlorite or calcium chlorite for example, in the presence of a chlorite-activation agent. The specific reaction conditions may be varied depending upon the extent of oxidizing or solubilizing desired and also upon the type of starch treated. The maximum proportions of chlorite used in my process is not in excess of 2.5%, calculated on the dry weight of the starch, and in most instances, an amount of chlorite substantially less than this value is sufficient.

The chlorite-activation agents used in accordance with my invention, and which makes possible the attainment of the desired solubilizing and oxidizing, without injury to the starch, in a rapid and easily controlled reaction, include acidic substances, soluble hypochlorites, chlorine gas and chlorine water. Substances which successfully activate the chlorite in the presence of starch are, in general, those which when added to a substantially neutral solution of a chlorite causes the production of chlorite dioxide gas. Hydrochloric and acetic acid, for example, are such substances, as are chlorine and soluble hypochlorites, hypochlorite of the alkali and alkaline earth metals, for instance.

The optimum amount of the chlorite-activation agents used in my present process is dependent largely upon the amount of chlorite present and the speed of reaction desired. An amount sufficient to accomplish the desired degree of activation of the chlorite without leaving a substantial residue in the reaction mixture is preferred. I am unable to explain the mechanism by which such activation agents promote the oxidizing action of the chlorite but it is a fact that when introduced into the mixture of starch and chlorite, a regular and rapid oxidizing of the starch follows, the extent and nature of which is not accomplished by the use of an equivalent quantity of either of the reagents alone.

As previously noted, the most desirable conditions of reaction for solubilizing or oxidizing starch for the present invention would depend upon the particular type of starch treated and the properties which it is desired to impart to the starch. In general, proportions of chlorite ranging from about 0.15%, or better from 0.25% to 2.5% by weight, on the dry starch treated, may be used.

In carrying out the process, the chlorite and the activation agent may be admixed with the starch in aqueous suspension, or, where a fluid activation agent, such as chlorine gas or hydrochloric acid vapors is used, the chlorite may be admixed with an aqueous starch suspension and the chlorite activated in contact with the starch by passing the activation agent into the suspension.

In the oxidizing and solubilizing of starch by my process, it is particularly desirable to use an activation agent of the acidic type, for instance, free acids or acid salts. Acids which may be conveniently used for this operation include acetic acid, oxalic acid and hydrochloric acid. As previously noted, the treatment should usually be carried out at a temperature below the gelatinization point of the starch, this point for corn-starch being 158° F. and for "tapioca" 148° F.

Though acidic activation agents are highly desirable, chlorine or soluble hypochlorites, sodium or calcium hypochlorites, for example, may be used with advantage under acid conditions. When employed under acid conditions the hypochlorite serves to accelerate the action of the acid present on the chlorite and permits a substantially decreased reaction time and operation at a lower temperature.

While the solution may have any degree of acidity, a pH between 3 and 6, for example, solutions having pH values below 3 are generally more satisfactory in that under such conditions, the time required for the desired extent of solubilizing and oxidizing is materially reduced.

The time required for the reaction is primarily dependent upon the extent of solubilization desired, i. e., the desired decrease in the viscosity of the starch. It is also dependent upon the type of starch treated and other operating conditions, including temperature and concentrations. The optimum treating time for any particular operation, is readily determined by testing samples of the starch periodically for viscosity, by conventional test methods, and continuing the treatment until the desired viscosity is obtained or until the chlorite has become exhausted. Should the chlorite become exhausted before the desired viscosity is reached, additional chlorite and activation agent may be added to complete the solubilization.

The invention will be illustrated by the following specific examples of the invention as applied to the solubilizing of corn-starch.

*Example I*

45,400 grams of corn-starch was suspended in 47,292 c. c. of water. 203 grams of sodium chlorite (0.45% by weight on the dry starch) was dissolved in the suspension and 3,404 c. c. of normal hydrochloric acid added, the pH resultant solution being 1.75. The reaction mixture was heated and maintained at a temperature of 135° F. for 7 hours, after which time the sodium chlorite had been completely consumed. 186 grams of sodium carbonate was then added to neutralize the acid and the mixture was then diluted with 10,000 c. c. of water and heated for 15 minutes at 190° F. after which the mixture was further diluted to a starch concentration of 6.72%. The final solution had a viscosity at 120° F. of 44 seconds Saybolt, a gravity of 2.6° Bé. and a pH of 6.86.

Where desirable the operation may be carried out at a lower temperature, but in such low-temperature operations a longer reaction time is required to attain the equivalent decrease in viscosity. Such an operation at a lower temperature is illustrated by the following example.

*Example II*

50 grams of corn-starch was suspended in water and 2% available chlorine added in the form of sodium chlorite. Acetic acid was then added to this solution in an amount sufficient to produce an acetic acid concentration of 0.28% (pH 3.5–4.5). The temperature was maintained at about 104° F. for 20 hours and at the end of this time the starch was filtered and dried and then made into a 5% suspension for the purpose of measuring its viscosity. The results of such measurement indicated that the starch thus treated had a viscosity of approximately 71 centipoises at 20° C., whereas, the original starch under like conditions formed a mixture which was too thick to pour at 20° C.

*Example III*

In a further test, in which the operating conditions were identical with those of Example II, except that 0.5% sulfuric acid was substituted for the acetic acid of the previous example, i. e. a pH of about 1–2, the viscosity of the starch, similarly determined, was reduced to 25.7 centipoises.

In addition to a reduction in viscosity, the starch treated in accordance with my invention will be found to have improved film-forming properties.

A primary advantage of my present invention is that the soluble inorganic chlorites when activated and used as described herein appear to have a specific action attacking only the hull of the starch granule, which is composed primarily of amylase, and does not attack, to any undesirable extent, at least, the body of the starch granule. While previously proposed processes for solubilizing starch have required rigorous control to avoid granular degradation, my present invention provides a simple, economical and non-destructive method of solubilizing starch.

I claim:

1. A process which comprises treating starch in an acid aqueous medium with about 0.15% to 2.5% by weight on the starch of a soluble inorganic chlorite in the presence of an activating agent for the chlorite, the agent being present in an amount effective to activate the chlorite, the temperature and the duration of he treatment being such as to result in substantial solubilization of the starch.

2. A process which comprises treating starch with an aqueous solution containing 0.25% to 2.5% by weight on the starch of a soluble inorganic chlorite and an amount of an acid sufficient to maintain the solution at a pH value below 6, the temperature and duration of the treatment being such as to result in substantial solubilization of the starch.

3. A process which comprises treating starch with an aqueous solution containing 0.25% to 2.5% by weight on the starch of a soluble inorganic chlorite and an amount of an acid sufficient to maintain the solution at a pH value below 3, the temperature and duration of the treatment being such as to result in substantial solubilization of the starch.

4. A process which comprises treating starch with an aqueous solution containing 0.25% to 2.5% by weight on the starch of sodium chlorite and an amount of an acid sufficient to maintain the solution at a pH value below 6, the temperature and the duration of the treatment being such as to result in substantial solubilization of the starch.

GEORGE P. VINCENT.